United States Patent
Gillham et al.

[11] Patent Number: 5,868,941
[45] Date of Patent: Feb. 9, 1999

[54] WATER TREATMENT SYSTEM

[75] Inventors: Robert W Gillham, Guelph; Robert M Focht, Mississauga; Pascale M Bonin, Vald'or; Mark D Pritzker, Waterloo, all of Canada

[73] Assignee: University of Waterloo, Waterloo, Canada

[21] Appl. No.: 722,076

[22] PCT Filed: Apr. 21, 1995

[86] PCT No.: PCT/CA95/00200

§ 371 Date: Oct. 18, 1996

§ 102(e) Date: Oct. 18, 1996

[87] PCT Pub. No.: WO95/29129

PCT Pub. Date: Nov. 2, 1995

[30] Foreign Application Priority Data

Apr. 23, 1994 [GB] United Kingdom ................ 94 08124

[51] Int. Cl.$^6$ ........................................... C02F 1/461
[52] U.S. Cl. ..................... 210/747; 205/745; 205/754; 210/748; 210/757; 210/908; 210/909; 405/128
[58] Field of Search ................... 205/745, 753, 205/754; 210/748, 757, 908, 909, 747; 405/128

[56] References Cited

U.S. PATENT DOCUMENTS

| | | | |
|---|---|---|---|
| 4,382,865 | 5/1983 | Sweeny | 210/743 |
| 5,266,213 | 11/1993 | Gillham | 210/747 |
| 5,362,402 | 11/1994 | Haitko et al. | 210/757 |
| 5,510,033 | 4/1996 | Ensley et al. | 210/611 |
| 5,534,154 | 7/1996 | Gillham | 210/668 |
| 5,543,059 | 8/1996 | Howson et al. | 210/757 |
| 5,565,107 | 10/1996 | Campen et al. | 205/688 |
| 5,602,296 | 2/1997 | Hughes et al. | 210/757 |
| 5,643,465 | 7/1997 | Stalberg | 210/757 |

*Primary Examiner*—Peter A. Hruskoci
*Attorney, Agent, or Firm*—Anthony Asquith & Co.

[57] ABSTRACT

Treatment of halogenated hydrocarbon contaminants in groundwater is accomplished by passing the water through a bed of granular iron (43). An electrical circuit (47) is promoted for providing electrons for reducing the contaminant. The circuit may be made using a DC supply, by configuring an electrolytic circuit, or by providing a layer of a second metal such as zinc placed next to the iron bed, thereby creating a galvenic circuit.

16 Claims, 2 Drawing Sheets

WATER TREATMENT SYSTEM

This invention relates to the treatment of water, especially groundwater, contaminated with halogenated hydrocarbons, such as carbon tetrachloride. Such contaminants can be difficult to treat in groundwater, because their natural degradation rate is very slow, they are transported long distances through the aquifer with the groundwater, and they are hazardous even in very small trace concentrations if they get into drinking water supplies.

BACKGROUND TO THE INVENTION

Patent publication WO-91/08176 disclosed the technique of passing water contaminated with an halogenated hydrocarbon through a (permeable) body of a metal, for example through a body of granular iron. The body of granular iron was placed in a trench excavated in the ground in the path of an oncoming plume of the contaminated groundwater, whereby the groundwater was caused to pass through the metal. Or, the contaminated water was taken out of the ground, and passed through a container of granular iron.

Developments of that technology are disclosed in WO-92/19556 and in WO-92/19545.

Provided there is a substantial residence time, and provided that strictly reducing conditions can obtain over a prolonged period, traces of halogenated hydrocarbons in the water can be caused to break down chemically in the presence of the iron or other metal.

It is surmised that the chemical breakdown reaction may be explained as follows:

Under the conditions of the process, iron metal oxidizes to the ferrous ion, releasing two electrons, i.e.

The halogenated hydrocarbon may be regarded as comprising a carbon-halogen component, C-Hal, and a hydrogen ion. Upon interacting with the electrons, the carbon reacts with the hydrogen ion to form a relatively non-hazardous hydrocarbon, such as methane gas, and halogen ion in solution, e.g chloride etc.

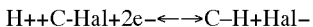

Thus, the halogenated hydrocarbon breaks down in the presence of iron, under reducing conditions.

However, what can also happen is that electrons available from the iron could, under reducing conditions, cause the surrounding water to dissociate, i.e

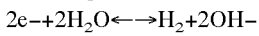

The $H_2$ bubbles off as hydrogen gas, but the presence of the $2OH-$ serves to raise the pH of the water, which can rise high enough, say to 9 or 10, that dissolved inorganic species present in the water, which precipitate out of solution at high pH, can start to do so. At high pH, for example, carbonates of various kinds, which are nearly always present in groundwater, can precipitate.

Under high pH conditions (i.e a pH of 9 or 10) the ferrous ions, if plentiful, could combine with the dissolved substances, and ferrous carbonate or ferrous hydroxide may precipitate.

The precipitates are a problem for the process of decomposition of halogenated hydrocarbons because they tend to become deposited in the pore spaces of the body of granular iron, and to clog up the body, making the body not so permeable to the flow of groundwater.

The invention is aimed generally at promoting the breakdown of the halogenated hydrocarbon. The invention, in a particular aspect, is aimed at inhibiting the precipitation of the iron species and other substances from solution, which, if permitted, might reduce the permeability of the body of granular iron, and might coat the particles of iron with substances that would impede the reduction of the halogenated contaminant.

GENERAL FEATURES OF THE INVENTION

The invention lies in providing a body of a first metal, for example iron, the metal being in finely divided powder, particulate, or granular form, and the body being porous and permeable enough for the water to pass therethrough.

Conditions should be maintained whereby oxygen and oxidising agents are excluded from the body of metal and from the water. One preferred manner in which oxygen may be excluded lies in the fact that the process is carried out below the water table.

It may be noted that if there is any oxygen present in the water, that oxygen will have to be removed from the water before the breakdown reaction will start. If only small quantities of oxygen are present, that is not very important, because the oxygen will usually be quickly used up in oxidizing small quantities of the metal. When all the oxygen that was dissolved in, or was otherwise available in, the water has been used up, the breakdown reaction may be expected to commence. Large quantities of dissolved oxygen would be a problem in the invention, however, because then much of the metal would simply be wasted through being oxidised, and because the reducing conditions required for the breakdown reaction would not be obtainable.

The invention lies in setting up an electrochemical circuit, by making the first metal an electrode, and maintaining the first metal at a potential relative to the surrounding water.

DETAILED DESCRIPTION OF PREFERRED EMBODIMENTS

By way of further explanation of the invention, exemplary embodiments of the invention will now be described with reference to the accompanying drawings, in which.

The apparatuses shown in the accompanying drawings and described below are examples which embody the invention. It should be noted that the scope of the invention is defined by the accompanying claims, and not necessarily by specific features of exemplary embodiments.

Figure 1:
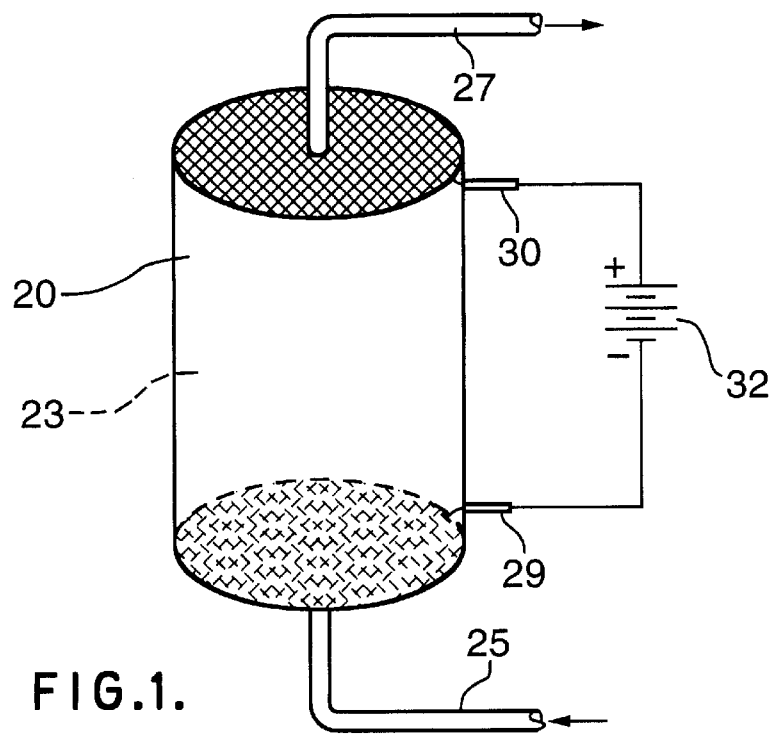
FIG. 1 is a diagrammatic view of a system for treating contaminated water in a canister or tank.

In FIG. 1, a tank or container 20 is provided, which in this case is made of an electrically-non-conducting material, being a plastic material.

Into the tank 20 is placed a body 23 of treatment material, which comprises a body of granular iron. The body of granular iron is so constituted that the body is porous or permeable to the passage of water therethrough.

The tank 20 is provided with inlet 25 and outlet 27 pipes, for conducting water through the tank. The body of granular iron completely fills the cross-sectional shape of the tank, whereby water cannot pass through the tank from the inlet to the outlet other than by passing through the granular iron.

Electrodes 29,30 are placed at the ends of the tank, close to the inlet and the outlet respectively. The electrodes should be of stainless steel or other non-corrosive conductor. The electrodes are coupled to a DC battery 32, whereby a voltage and current are applied between the two electrodes.

The body 23 of granular iron is so set up in the tank 20 that the electrodes 29,30 are in electrical contact with the opposite ends of the body of granular iron, whereby the voltage and current are applied to the body.

In use, water contaminated with an halogenated hydrocarbon is fed through the tank 20. The presence of the voltage and current has been observed to increase the rate at which the halogenated hydrocarbon breaks down; and also has been found to inhibit the deposition of iron and other precipitates.

In a particular example, a column 10 cm in length and 8 cm in diameter was packed with granular iron having a mean grain diameter of 100 mesh. Water containing 10 milligrams per litre of tetrachloroethene (PCE) in solution was passed through the column. About 2 volts DC was applied across the stainless steel electrodes, resulting in a flow of electrons through the column.

It was observed that the rate of degradation of the PCE (ie the concentration of PCE in the outlet compared with the concentration of PCE in the inlet) speeded up by a factor of about three times. From this, it may be surmised that the electric current acts as an additional source of electrons (additional, that is, to the electrons arising from the oxidation of the iron), resulting in increased rates of removal of the contaminants.

Figure 2:
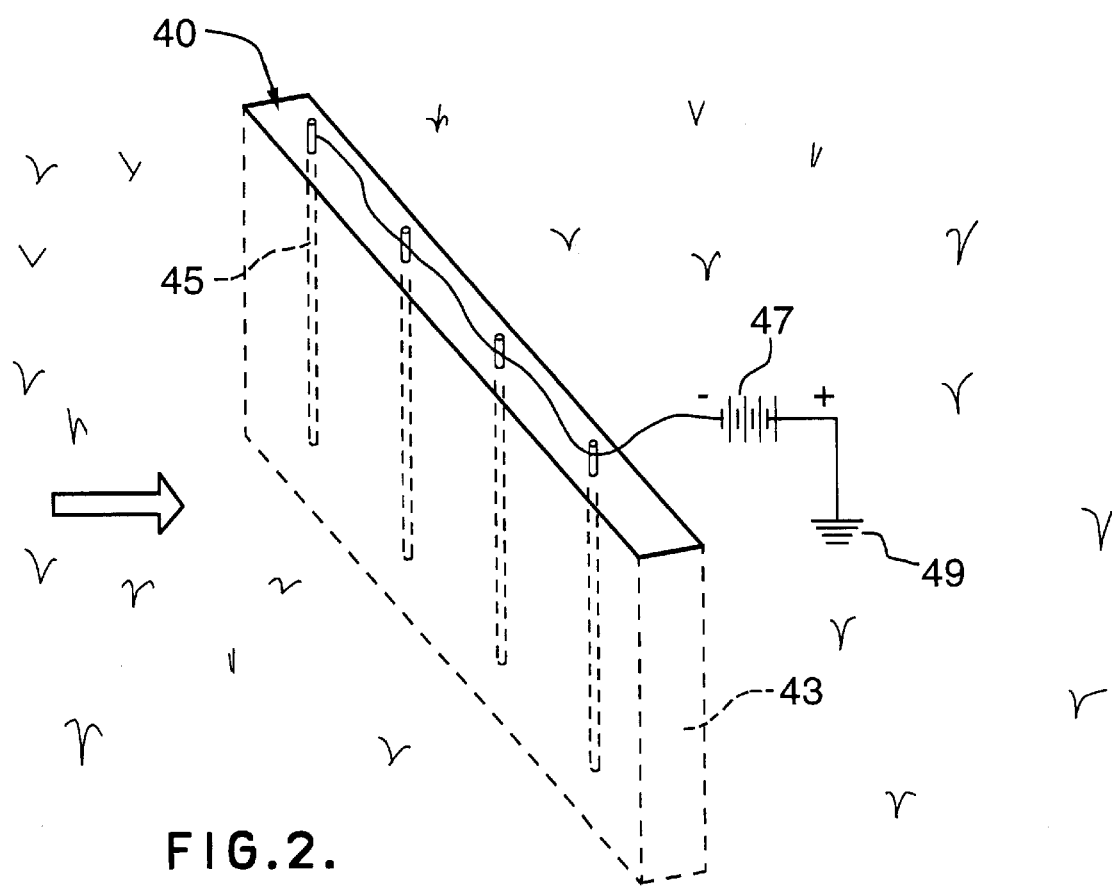
FIG. 2 is a diagrammatic view of a system for treating contaminated groundwater in-situ.

FIG. 2 shows an arrangement suitable for in-situ (i.e in-ground) operation, for treating contaminated groundwater while the water remains in the ground.

Here, a trench 40 is excavated in the material of the aquifer, and the body 43 of granular iron is placed in the trench. The body 43 may comprise granular iron mixed with sand, as an inert filler, for bulk, (so long as adequate electrical conductivity was maintained in the body), or granular iron mixed with an adsorbing agent, such as activated carbon. As mentioned in WO-92/19556, the adsorbent retards the dissolved contaminants while the water passes through un-retarded, whereby the contaminants are retained in the trench (and close to the granular iron) for a much longer period of time than the water itself stays in the trench. Providing the adsorbent maximises the likelihood that there is time for the breakdown reaction to be completed, while minimising the needed quantity of granular iron.

In FIG. 2, electrodes, comprising rods 45 of stainless steel, are inserted in the body 43 of granular iron. The electrodes are coupled to a DC battery 47, and the other side of the battery is grounded, as at 49. Thus, the electrical circuit is completed through the material of the aquifer and through the groundwater.

It might be considered from the diagrams that in FIGS. 1 and 2 the whole body of granular iron constitutes the one electrode.

The iron itself, of course, being a metal, and conductive, will not support very much of a voltage gradient.

It might be surmised that, insofar as the body 43 of iron is itself an electrode, that the body of iron should be the anode, whereby the oxidation of the iron would be enhanced, releasing more electrons.

However, it is observed that the breakdown of the halogenated hydrocarbon is enhanced when the iron is made the cathode, and it is observed that the breakdown proceeds at a faster rate. Also, it is observed, when the iron is made the cathode, that there is less deposition of precipitated material present in the iron bed.

It may be surmised that, in order for the halogen breakdown to be speeded up, the conditions must have been favouring reduction of the halogen in the iron bed, at the expense of oxidation of the iron, while oxygen evolution was happening at the anode.

In the iron bed, the iron oxidation reaction is:

$Fe \rightarrow Fe^{2+} + 2e^-$

This is the reaction that is slowed by the fact that the iron bed is the cathode.

At the anode, the oxygen evolution reaction, due to the electrolysis of the water, proceeds as $2H_2O \rightarrow O_2 + 4H^+ + 4e^-$ whereby the H+, upon entering solution, also results in a lowering of the pH.

Making the iron bed the cathode results in the favouring of reduction of the halogen contaminant at the expense of iron oxidation, while oxygen evolves at the anode. The pH is lowered, at least near the anode, and precipitation of iron compounds is lowered because of the lower iron oxidation.

In order for the reduction of the halogenated hydrocarbon to proceed, the conditions must remain reducing, and the system designer should ensure that reducing conditions are favoured. This may be done, in an in-ground treatment system, for instance, by providing that all the iron is placed well below the water table. Also, for instance, the oxygen gas that bubbles off the anode due to electrolysis of the water must not be allowed to come in contact with or pass through the iron bed. In a treatment installation, the system designer should see to it that the anode is so located that oxygen bubbling therefrom will not pass through the bed of iron.

The anode may be configured as a separate series of stainless steel rods inserted in the aquifer material, downstream of the iron bed. Any oxygen bubbling off the anode then would not affect the iron bed.

In considering why the halogen reduction proceeds quicker when the iron bed is made the cathode, it may be noted that in fact the number of electrons produced by the naturally-oxidizing iron is already ample. Therefore, the body of iron may be made the cathode. Although this inhibits oxidation of the iron, the benefit of making the iron the cathode is that less of the iron precipitates.

It should be pointed out that the reduction of the halogenated hydrocarbon, by the use of electricity, requires that the electrode (preferably the cathode) at which the reduction takes place is of a large surface area. The granular iron provides such a large-area electrode.

Figure 3:
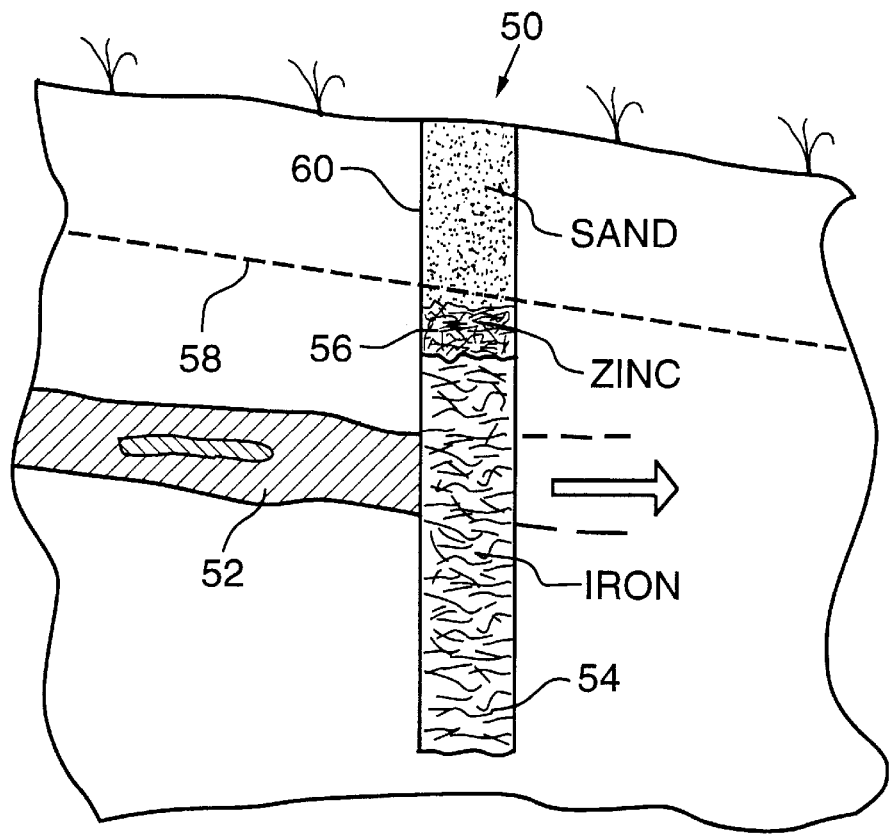
FIG. 3 is a diagrammatic view of another system for treating contaminated groundwater in-situ.

FIG. 3 shows an in-ground water treatment installation, in which a trench 50 is excavated in the path of an on-coming plume 52 of a groundwater contaminant, being a halogenated hydrocarbon such as carbon tetrachloride. In the trench 50 is placed a body 54 of granular iron.

Located on top of the body 54 of granular iron is a layer 56 of zinc filings. In place of zinc, another metal may be used having a lower potential than iron. The zinc filings are placed directly on top of the granular iron, whereby electrical contact is made between the two metals.

The zinc is placed below the water table 58, and the space 60 above the water table is filled in with sand, or other available filler material.

No outside source of electricity is connected to the metals, but in fact the metals themselves in this configuration serve to generate an electric current. In an iron/zinc pair, the iron becomes the cathode and the zinc the anode.

The zinc oxidizes, $Zn \rightarrow Zn^{2+} + 2e^-$, which creates the supply of electrons needed for the breakdown of the contaminant. The iron is not called upon to oxidize, and to supply electrons for the reduction of the contaminant. There may be some deposition of precipitates, such as zinc carbonate, in the zinc layer, but that does not matter so much, especially if the treatment system is arranged so that the water, or most of the water, is not actually required to pass through the zinc layer. The main bulk of material on which the breakdown of the contaminant occurs remains the iron. Iron is considerably cheaper than zinc in bulk quantities, and besides, iron is relatively harmless if it should become dissolved in the groundwater—if forced to choose, most authorities would prefer to have Fe2+ in the treated groundwater rather than Zn2+.

It may be noted that mixing or dispersing the zinc in with the iron has less effect in promoting the breakdown of the halogenated hydrocarbon. The zinc should preferably be placed in a layer, as described, whereby the layer of zinc can act as a separate electrode with respect to the bed of iron. However, it is also contemplated that the zinc may be placed in two or more layers disposed through the iron.

Figure 4:
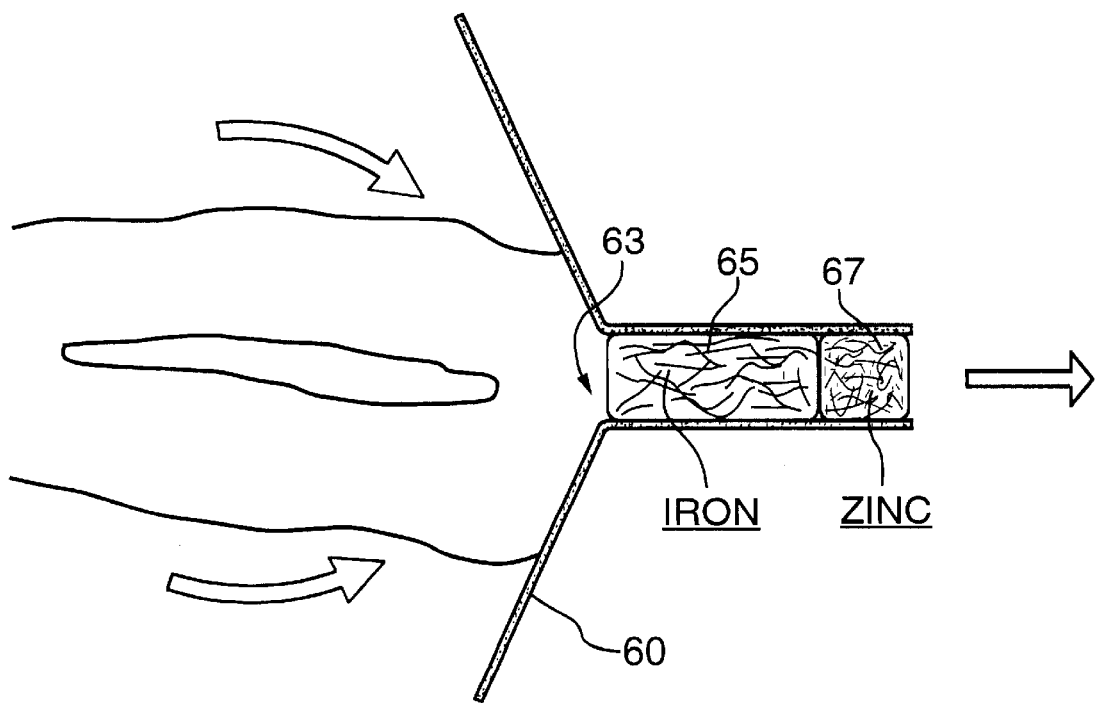
FIG. 4 is a diagrammatic view of a further system for treating contaminated groundwater in-situ.

The zinc may be placed on top of the bed of iron, as shown; or, the zinc may be placed in series with the bed of iron in the ground. Patent publication WO-93/22241 shows a funnel-and-gates treatment system; in that system, contaminated water is funnelled through a gate, in which is placed the treatment material. In FIG. 4, a barrier 60 is placed in the ground, and the moving groundwater is funnelled into a gate 63. In the gate is placed a bed of granular iron 65. Behind the bed of iron (i.e in the gate, but downstream of the iron) is placed a bed of zinc 67. The zinc and the iron are arranged so as to promote the electrochemical activity as described. The zinc should be so placed in relation to the iron that the electrons arising from the oxidation of the zinc are donated to the iron.

The zinc, being a metal of lower potential than the iron, and arranged as an anode, donates electrons by galvanic action. Applying supplied electricity to the first metal as one electrode, the other electrode being separated, the electrons are provided by electrolytic action. As described, both the galvanic and the electrolytic actions may be utilized to enhance the breakdown of halogenated hydrocarbons in groundwater.

Although the invention has been described as it relates to treatment using iron, other metals may be used, for example: zinc, aluminum, magnesium, other transition metals, and metal couples such as copper coated iron.

The invention may be used to treat a wide range of organic contaminants, including aliphatics, aromatics, and polyaromatics with halogen and nitrogen group substituents (although the invention has been described as it relates to the treatment of halogenated hydrocarbons). Examples include solvents such as carbon tetrachloride, tetrachlorethene, and hexachlorethane; hexachlorobenzene, nitrosamines, explosives such as trinitrotoluene, PCP's, nitro-PAH's, and certain pesticides.

We claim:

1. Procedure for treating water contaminated with an organic contaminant, comprising the steps of;
   providing a body of a metal, the metal being in finely divided particulate form, and the body being porous and permeable enough for the water to pass therethrough;
   passing the contaminated water therethrough;
   creating and maintaining reducing conditions in the body of the metal and in the water passing therethrough;
   creating an electrolytic circuit, comprising two electrodes, being an anode and a cathode, and an electrolyte;
   configuring the body of the metal as one of the electrodes, and the contaminated water as the electrolyte;
   providing a source of electrical energy, and applying a sufficient voltage derived from the said source between the two electrodes, and maintaining the body of metal at a voltage relative to the passing contaminated water to enhance breakdown of the organic contaminant in the water.

2. Procedure of claim 1, wherein the contaminant is a halogenated hydrocarbon.

3. Procedure of claim 1, wherein the metal is iron.

4. Procedure of claim 1, including the step of so configuring the electrolytic circuit that the body of the metal is a cathode in the circuit.

5. Procedure of claim 1, including the steps of:
   placing the body of metal in an aquifer, or in the ground;
   wherein the contaminated water is groundwater in the aquifer;
   so arranging the body of metal in the aquifer that the contaminated groundwater passes therethrough;
   and configuring the aquifer or ground material in which the body of metal is placed as the second electrode, and the groundwater as the electrolyte.

6. Procedure of claim 5, including the step of locating the body of metal substantially wholly below the water table.

7. Procedure of claim 5, including the step of applying the voltage to the body of the metal through a conductor, which comprises a metal rod or rods inserted into the body of the metal.

8. Procedure of claim 5, including the step of applying the voltage such that the body of the metal is the cathode of the electrolytic circuit.

9. Procedure of claim 8, including the step of configuring the anode of the electrolytic circuit as a separate series of metal rods, inserted in the aquifer material, downstream of the body of the metal.

10. Procedure of claim 8, including the step of so placing the anode in relation to the body of the metal that gases produced at the anode by the electrolytic action can bubble off the anode and can escape and dissipate without contacting the body of the metal.

11. Procedure for treating water contaminated with an organic contaminant, comprising the steps of;
   providing a body of a first metal, the metal being in finely divided particulate form, and the body being porous and permeable enough for the water to pass therethrough;
   passing the contaminated water therethrough;
   creating and maintaining reducing conditions in the body of the first metal and in the water passing therethrough;
   providing an electrochemical circuit, by making the body of the first metal an electrode, and maintaining the body of the first metal at a voltage relative to the surrounding water;
   placing the body of the first metal in an aquifer, or in the ground, the contaminated water being groundwater in the aquifer;
   so arranging the body of the first metal in the aquifer that the contaminated groundwater passes therethrough;
   creating the electrochemical circuit as an electrolytic circuit, comprising two electrodes, being an anode and a cathode, and an electrolyte;
   configuring the body of the first metal as one electrode, and surrounding aquifer or ground material as the second electrode, and the groundwater as the electrolyte;

and applying a sufficient voltage between the two electrodes to enhance breakdown of the organic contaminant in the groundwater.

12. Procedure of claim 11, including the step of applying the voltage to the body of the first metal through a conductor, which comprises a metal rod or rods inserted into the body.

13. Procedure of claim 11, including the step of applying the voltage such that the body of the first metal is the cathode of the electrolytic circuit.

14. Procedure for treating water contaminated with an organic contaminant, comprising the steps of:

providing a body of a first metal, the metal being in finely divided particulate form, and the body being porous and permeable enough for the water to pass therethrough;

passing the contaminated water therethrough;

creating and maintaining reducing conditions in the body of the first metal and in the water passing therethrough;

providing an electrochemical circuit, by making the first metal an electrode, and maintaining the first metal at a sufficient voltage relative to the surrounding water to enhance breakdown of the organic contaminant in the water;

placing the body of the first metal in an aquifer, or in the ground;

wherein the contaminated water is groundwater, in the aquifer;

so arranging the body of the first metal in the aquifer that the contaminated groundwater passes therethrough;

creating the electrochemical circuit as a galvanic circuit, comprising two electrodes, being an anode and a cathode, in electrical contact with each other;

providing a body of a second metal, and placing the body of the second metal in electrical contact with the body of the first metal;

so configuring the galvanic circuit that one of the bodies of metal is the anode, and the other body of metal is the cathode, of the galvanic circuit;

providing the second metal in the form of a metal that is more electro-positive than the first metal, whereby the second metal becomes the anode, and the first metal the cathode, of the galvanic circuit;

arranging the two bodies as separate structures or layers, which are arranged for electrical contact with each other, but are so arranged that the two metals are substantially not mixed together;

physically arranging the bodies so that a majority of the contaminated groundwater passes through the first metal, but does not pass through the second metal.

15. Procedure of claim 14, including the step of:

placing the body of the first metal in a trench, the trench being located in the path of an oncoming plume of the contaminated groundwater;

placing the body of the second metal in the trench, and on top of the body of the first metal;

and so arranging the trench and the bodies therein that the body of the second metal lies below the water table.

16. Procedure of claim 14, wherein the second metal is zinc.

* * * * *